United States Patent [19]

Morioka

[11] Patent Number: 5,084,512

[45] Date of Patent: Jan. 28, 1992

[54] COMPOSITION THAT CONTAINS A POLYPHENYLENE ETHER RESIN AND A POLYESTER

[75] Inventor: Masataka Morioka, Moka, Japan

[73] Assignee: GE Plastics Japan, Ltd., Tokyo, Japan

[21] Appl. No.: 450,096

[22] Filed: Dec. 13, 1989

[30] Foreign Application Priority Data

Dec. 13, 1988 [JP] Japan .................... 63-312821

[51] Int. Cl.$^5$ .................... C08L 67/02; C08L 71/12
[52] U.S. Cl. .................... 525/92; 525/68; 525/152; 525/397
[58] Field of Search ............. 525/397, 390, 905, 68, 525/92, 152

[56] References Cited

U.S. PATENT DOCUMENTS 4,755,566 7/1988 Yates, III .................... 525/397
4,957,966 9/1990 Nishio et al. .................... 525/397

Primary Examiner—Jacob Ziegler
Attorney, Agent, or Firm—Francis T. Coppa

[57] ABSTRACT

The present invention concerns a resin composition that contains a polyphenylene ether, an oxazolinyl group-containing polyphenylene ether, and a polyester.

15 Claims, No Drawings

COMPOSITION THAT CONTAINS A POLYPHENYLENE ETHER RESIN AND A POLYESTER

DETAILED DESCRIPTION OF THE INVENTION

1. Industrial Application Fields of the Invention

The present invention concerns a resin composition that contains polyphenylene ether, oxazolinyl group-containing polyphenylene ether, and polyester.

2. Background of the Invention

Although polyphenylene ether exhibits various excellent properties (e.g., high heat resistance as well as excellent strength, electrical properties, and dimensional precision), said resin is easily degraded by aromatic hydrocarbons (e.g., benzene, etc.) or halogenated hydrocarbons (e.g., Triclene, etc.). Since the molding efficiency is inferior, furthermore, said resin is seldom used as a single molded product.

To improve the molding efficiency of polyphenylene ether, attempts have been made to mix a polystyrene resin. If this method is implemented, the molding efficiency is improved, but since the polystyrene resin is also degraded by aromatic hydrocarbons (e.g., benzene, etc.) or halogenated hydrocarbons (e.g., Triclene, etc.), it is impossible to improve the solvent resistance by adding said polystyrene resin.

Attempts have also been made to add a thermoplastic polyester resin to simultaneously improve the molding efficiency and solvent resistance. Since the miscibility between the polyphenylene ether and thermoplastic polyester is inferior, however, the mechanical strength of a molded product derived from the resulting mixture is inevitably inferior.

If a compound that contains at least one group selected from among carboxyl groups, acid anhydride groups, acid amide groups, imide groups, carboxylic acid ester groups, epoxy groups, amino groups, and a hydroxyl group is added to a polyphenylene ether-polyester mixture as a third component, a resin composition that yields a molded product characterized by excellent bending elasticity, heat resistance, molding efficiency, and water resistance is allegedly obtained (see Japanese Kokoku Patent No. Sho 63[1988]-350).

It has also been proposed that a resin composition that yields a molded product characterized by excellent physical appearance, impact resistance, molding efficiency, dimensional precision, and chemical resistance can be obtained by adding a bifunctional epoxy compound (see Japanese Kokoku Patent No. Sho 63[1988]-39958).

Attempts have also been made to enhance the dispersibility between the polyphenylene ether and polyester by adding a polymer that has been obtained by reacting an epoxy group-containing polyphenylene ether with a polyester (see Japanese Kokoku Patent No. Sho 63[1988]-125569).

PROBLEMS TO BE SOLVED BY THE INVENTION

The foremost objective of the present invention is to provide a resin composition that contains a polyphenylene ether and polyester and yields a molded product characterized by excellent mechanical strength (especially the impact resistance) as well as superb solvent resistance.

MECHANISM FOR SOLVING THE PROBLEMS

The present inventors have discovered that the mechanical strength of said molded product can be significantly improved by at least partially introducing an oxazolinyl group to a polyphenylene ether resin.

MECHANISM FOR SOLVING THE PROBLEMS

Briefly, the present invention concerns a resin with the following characteristics: in a resin composition that contains 5 5-90 wt % of a polyphenylene ether resin and 95-10 wt % of a polyester resin, at least 1 wt % of said polyphenylene ether resin is modified by terminal oxazolinization.

As polyphenylene ether resin (which is not terminal-oxazolinized) of the present invention, conventional resins can be used. For example, homopolymers or copolymers obtained by oxidizing and polymerizing one or more monocyclic phenol compounds represented by the following general formula:

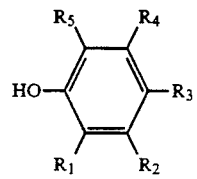

(in which $R_1$ through $R_5$ are selected from among a hydrogen atom, halogenated hydrocarbon groups, hydrocarbon groups, and substituted hydrocarbon groups) can be appropriately used.

Concrete examples of such polymers include poly(2,6-dimethyl-1,4-phenylene) ether, poly(2,6-diethyl-1,4-phenylene) ether, poly(2-methyl-6-ethyl-1,4-phenylene) ether, poly(2-methyl-6-propyl-1,4-phenylene) ether, poly(2,6-dipropyl-1,4-phenylene) ether, poly(2-ethyl-6-propyl-1,4-phenylene) ether, etc. An especially desirable polyphenylene ether resin is poly(2,6-dimethyl-1,4-phenylene) ether. As a polyphenylene ether copolymer, a copolymer in which the aforementioned polyphenylene ether repetition unit is partially substituted with an alkyltrisubstituted phenol (e.g., 2,3,6-trimethylphenol, etc.) can be used. It is also possible to use a copolymer in which a styrene compound is grafted with said polyphenylene ether. As such a styrene-grafted polyphenylene ether, a copolymer obtained by graft-polymerizing a styrene compound (e.g., styrene, α-methylstyrene, vinyltoluene, chlorostyrene, etc.) with the aforementioned polyphenylene ether can be appropriately used.

It is desirable that the specific vicosity of the polyphenylene ether of the present invention (which is measured in a chloroform solvent at 30° C.) be 0.15-0.65 dL/g, preferably 0.30-0.60 dL/g. If the specific viscosity is lower than 0.15, the resulting composition is inevitably brittle and the mechanical strength is low. If the specific viscosity exceeds 0.65, on the other hand, the viscosity difference of the polyphenylene ether and the thermoplastic polyester resin is excessively large. Thus, it is difficult to obtain a satisfactory dispersibility, and it is difficult to obtain the objectives of the present invention.

The polyester resin used in the present invention contains an intramolecular ester bond in the principal chain. As such, polycondensed polyesters derived from dicarboxylic acids or their derivatives and divalent alcohols or divalent phenol compounds, polycondensed polyesters derived from dicarboxylic acids or their derivatives and cycloether compounds, polycondensed polyesters derived from metal dicarboxylates and dihalogenated compounds, and polyesters obtained by ring-opening and polymerizing cycloester compounds can be used. As the aforementioned acid derivatives, acid anhydrides, esters, and acid chlorides can be used. As said dicarboxylic acids, both aliphatic and aromatic compounds can be used. Representative examples are terephthalic acid, isophthalic acid, phthalic acid, chlorophthalic acid, oxalic acid, succinic acid, and adipic acid. Especially desirable results are obtained if aromatic dicarboxylic acids are used. In particular, terephthalic acid, isophthalic acid, and phthalic acid are ideal.

As divalent alcohols, ethylene glycol, propylene glycol, butane-1,4-diol, hexamethylene glycol, etc. can be used. In particular, ethylene glycol and butane-1,4-diol are ideal. As divalent phenol compounds, bisphenol A, resorcinol, etc. can be used. As cycloether compounds, ethylene oxide and propylene oxide can be used. As cyclic compounds [sic], ε-caprolactone, etc. can be used. As dihalogenated compounds that are reacted with metal dicarboxylates, compounds obtained by substituting two hydroxyl groups of the aforementioned divalent alcohol compounds or divalent phenol compounds with halogen atoms (e.g., chlorine, bromine, etc.) are used.

The polyester resin that is used in the resin composition of the present invention is manufactured by using the aforementioned feed components according to conventional procedures. It is desirable that the molecular weight be selected so that the specific viscosity, which is measured in a phenoltetrachloroethane mixed solvent (weight ratio: 1:1) at 30° C., will be 0.50 or above, preferably 0.55 or above. If the specific viscosity is lower than 0.50, it is difficult to produce a mixture characterized by excellent mechanical properties even if the resulting polyester is mixed with polyphenylene ether.

The terminal-oxazolinized polyphenylene ether resin of the present invention is obtained by introducing an oxazolinyl group (which may or may not be substituted)

to the terminal of polyphenylene ether. The oxazolinyl group may be bonded with polyphenylene ether by an appropriate linking group (e.g., phosphate bond, etc.). For example, if an oxazolinyl group-containing compound represented by the following formula I:

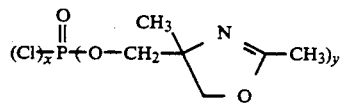

(in which x is 1 or 2; the sum of x and y is 3) is thermally reacted with polyphenylene ether in a solvent, a terminal-oxazolinized modified polyphenylene ether represented by the following formula II is obtained:

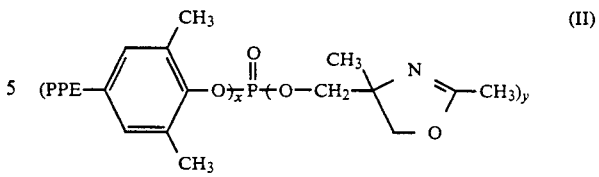

(in which PPE refers to the polyphenylene ether principal chain; x and y are the same as the aforementioned definitions in formula I).

The terminal-modified polyphenylene ether can be precipitated in methanol or acetone for purifying purposes. If necessary, said precipitate is filtered and dried.

The aforementioned compound represented by formula I, which is used in said terminal-oxazolinizing process, can be manufactured by reacting phosphorus oxychloride, which is represented by the following formula III, with a compound represented by the following formula IV:

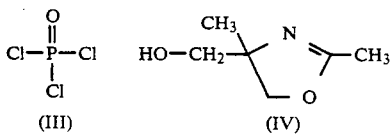

In said formula IV, ethylene and propylene groups may be used instead of the methylene group.

It should be noted that the aforementioned compounds in no way constitute an exhaustive list of compounds that can be used for terminal-oxazolinizing purposes in the present invention. As a general rule, compounds that contain halogenated groups of phosphorus atoms and an oxazolinyl group within a single molecule and compounds that contain halogenated acyl atom groups and an oxazolinyl group in a single molecule can be appropriately used.

As far as the present invention is concerned, it is desirable that the relative quantities of the polyphenylene ether resin and the polyester resin be 5–90 wt % and 95–10 wt %, respectively, preferably 20–80 wt % and 80–20 wt %, respectively. If the quantity of the polyphenylene ether resin is less than said range, the heat resistance is inferior.

In the present invention, if the quantity of the polyester resin is smaller than 5–90 wt %, the solvent resistance deteriorates. As far as the present invention is concerned, furthermore, it is necessary that at least 1 wt %, preferably at least 5 wt %, of the polyphenylene ether resin be terminal-oxazolinized. The terminal oxazolinyl group enhances the dispersibility between the polyphenylene ether resin and polyester in a process in which the resin composition is melted with heat and molded. Thus, the impact resistance is presumably improved.

The resin composition of the present invention may also contain various conventionally-known components. For example, styrene resins and styrenic elastomeric copolymers that are miscible with polyphenylene ether (e.g., styrene/ethylenepropylene copolymer, styrene/ethylene-butylene copolymer, styrene/butadiene copolymer, etc.) as well as other elastomers that are miscible with polyester may be added safely. It is also possible to add conventional fillers, flame retardants, etc.

In the paragraphs to follow, the contents of the present invention will be explained in further detail with reference to application examples.

APPLICATION EXAMPLES

Poly(2,6-dimethyl-1,4-phenylene) ether (specific viscosity: 0.46 dL/g in chloroform at 30° C.) was used as polyphenylene ether in subsequent application examples.

A terminal-oxazolinizing treatment was carried out by reacting 100 parts by weight of the aforementioned polyphenylene ether with 3 parts by weight of the compound represented by formula I (mixture of compounds in which x values are 1 and 2) in toluene. In the aforementioned process, 6 parts by weight of dimethyl-n-butylamine was used as an acid, receiver.

Polybutylene terephthalate (Valox® resin, Engineering Plastics Co.) was used as a polyester.

In some of the examples, SEBS (KG 1651, manufactured by Shell Chemical Co.) was used as a styrene elastomer.

A resin composition characterized by one of the compositions shown in the table below (parts by weight) was prepared. After the individual components shown in the table had been sufficiently dispersed and mixed in a Henschel mixer, the resulting mixture was melt-mixed in a 50 mm biaxial screw extruder at a cylinder temperature of approximately 280° C. Thus, a pellet was obtained. The resulting pellet was injection-molded under the following conditions. Thus, a physical property measurement test piece was obtained: cylinder temperature: 260° C.; injection pressure: 1,000 kg/cm²; mold temperature: 80° C.

The impact resistance was evaluated by measuring the Izod impact strength (with a notch) according to the procedures specified in ASTM D 256.

The solvent resistance was evaluated by the naked eye after the test piece (⅛×½×2.5″) had been immersed in benzene at 23° C. for 1 hour.

wherein at least 1 weight % of the polyphenylene ether resin has been modified by terminal oxazolinization.

2. The composition of claim 1 wherein the polyphenylene ether resin of component A is a homopolymer or copolymer obtained by oxidizing and polymerizing one or more monocyclic phenol compounds represented by the formula

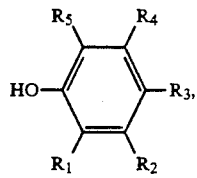

wherein $R_1$ through $R_5$ are selected from the group consisting of hydrogen, hydrocarbon groups, halogenated hydrocarbon groups, and substituted hydrocarbon groups.

3. The composition of claim 1 wherein the polyphenylene ether resin is poly(2,6-dimethyl-1,4-phenylene) ether.

4. The composition of claim 1 wherein the polyphenylene ether resin is a copolymer which includes at least one alkyl-trisubstituted phenol.

5. The composition of claim 4 wherein at least one of the trisubstituted phenols is 2,3,6-trimethylphenol.

6. The composition of claim 1 wherein the polyester resin is a material selected from the group consisting of:
   a) polycondensed polymers derived from dicarboxylic acids or their derivatives, with divalent alcohols or divalent phenol compounds;
   b) polycondensed polymers derived from dicarboxylic acids or their derivatives, and cycloether compounds;
   c) polycondensed polymers derived from metal dicarboxylates and dihalogenated compounds; and

TABLE

|     |                              | (1) 実施例1 | (1) 実施例2 | (2) 比較例1 | (1) 実施例3 | (1) 実施例4 | (2) 比較例2 | (1) 実施例5 | (2) 比較例3 |
|-----|------------------------------|-----------|-----------|-----------|-----------|-----------|-----------|-----------|-----------|
| (3) | ポリフェニレンエーテル            | 50        | 20        | 60        | 30        | 10        | 40        | 20        | 40        |
| (4) | 変性処理した ポリフェニレンエーテル | 10        | 40        | —         | 10        | 30        | —         | 20        | —         |
| (5) | ポリブチレンテレフタレート          | 40        | 40        | 40        | 60        | 60        | 60        | 50        | 50        |
|     | SEBS                         |           |           |           |           |           |           | 10        | 10        |
| (6) | アイゾット (kg-cm/cm)           | 4.1       | 6.3       | 1.4       | 4.9       | 6.8       | 2.1       | 25.7      | 2.8       |
| (7) | 耐 溶 剤 性                    | (8)良     | (8)良     | (8)良     | (8)良     | (8)良     | (8)良     | (8)良     | (8)良     |

Key to previous table
(1) Application Example
(2) Comparative Example
(3) Polyphenylene ether
(4) Modified polyphenylene ether
(5) Polybutylene terephthalate
(6) Izod impact strength
(7) Solvent resistance
(8) Excellent As the foregoing explanations clearly demonstrate, it is obvious that the impact resistance of the molded product derived from the resin composition of the present invention is significantly improved, and at the same time, an excellent solvent resistance is obtained.

I claim:
1. A polymer composition comprising:
   A) 5–90 weight % polyphenylene ether resin; and
   B) 95–10 weight % polyester resin, d) polymers obtained by ring-opening and polymerizing cycloester compounds.

7. The composition of claim 6, wherein the polyester is polybutylene terephthalate.

8. The composition of claim 1, wherein the modified polyphenylene ether resin is obtained by reacting a substituted or unsubstituted oxazolinyl group of the formula

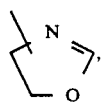

with a terminal site on the polyphenylene ether polymer.

9. The composition of claim 8 wherein the oxazolinyl group is bonded to the polyphenylene ether by a phosphate bond.

10. The composition of claim 1 wherein the material used to modify the polyphenylene ether resin is selected from the group consisting of:
  a) compounds that contain halogenated groups of phosphorus atoms and an oxazolinyl group within a single molecule; and
  b) compounds that contain halogenated acyl groups and an oxazolinyl group in a single molecule.

11. The composition of claim 1, further comprising styrene resins or styrenic elastomeric copolymers.

12. The composition of claim 11, wherein the elastomeric copolymer is selected from the group consisting of styrene/ethylene-propylene copolymers; styrene/ethylene-butylene copolymers; and styrene/butadiene copolymers.

13. The composition of claim 1, further comprising at least one additive selected from the group consisting of fillers and flame retardants.

14. The composition of claim 1, wherein at least 5 weight % of the total polyphenylene ether resin has been terminal-oxazolinized.

15. The composition of claim 1, comprising 20–80 weight percent polyphenylene ether resin, and 80-20 weight % polyester resin.

* * * * *